(12) United States Patent
Zu et al.

(10) Patent No.: US 12,488,590 B2
(45) Date of Patent: Dec. 2, 2025

(54) PERSON FLOW ANALYSIS METHOD AND SYSTEM, ELECTRONIC DEVICE, AND READABLE STORAGE MEDIUM

(71) Applicant: BOE TECHNOLOGY GROUP CO., LTD., Beijing (CN)

(72) Inventors: Chunshan Zu, Beijing (CN); Xiaojun Tang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 449 days.

(21) Appl. No.: 17/995,269

(22) PCT Filed: Sep. 10, 2021

(86) PCT No.: PCT/CN2021/117702
§ 371 (c)(1),
(2) Date: Sep. 30, 2022

(87) PCT Pub. No.: WO2022/078134
PCT Pub. Date: Apr. 21, 2022

(65) Prior Publication Data
US 2023/0154192 A1    May 18, 2023

(30) Foreign Application Priority Data
Oct. 16, 2020   (CN) .......................... 202011108232.0

(51) Int. Cl.
*G06V 20/52*   (2022.01)
*G06V 10/22*   (2022.01)
(52) U.S. Cl.
CPC ............ *G06V 20/53* (2022.01); *G06V 10/225* (2022.01); *G06V 2201/07* (2022.01)

(58) Field of Classification Search
CPC .. G06V 20/53; G06V 10/225; G06V 2201/07; G06V 10/245; G06V 40/161; G06V 20/52; G06V 20/42
See application file for complete search history.

(56) References Cited

U.S. PATENT DOCUMENTS 11,157,720 B2 * 10/2021 Pu .......................... G06V 40/161
2009/0167493 A1 * 7/2009 Colciago .................. G07C 9/37
348/E5.022
(Continued)

FOREIGN PATENT DOCUMENTS

CN         102799935 A     11/2012
CN         106372570 A      2/2017
(Continued)

OTHER PUBLICATIONS

CN-108986064-A A kind of people flow rate statistical method, equipment and system 2018.*
(Continued)

*Primary Examiner* — Santiago Garcia
(74) *Attorney, Agent, or Firm* — McCoy Russell LLP (57) ABSTRACT

The present disclosure provides a person flow analysis method and system, an electronic device, and a readable storage medium. The method includes: obtaining a video image of a target area; identifying and tracking target features of persons in the video image; generating person flow data for the target area according to movement states of the target features of the persons relative to a specific position in the target area. By identifying and monitoring the target features in the video images of the target area, it does not need to analyze and identify all features of the persons, thereby reducing the amount of calculation and increasing the scope of application. By analyzing a movement state of the target feature relative to the specific position, movement (Continued)

mode of a user in the target area can be obtained, thereby improving accuracy of analysis of the person flow in the target area.

16 Claims, 4 Drawing Sheets

(56) References Cited

U.S. PATENT DOCUMENTS

| | | | | |
|---|---|---|---|---|
| 2011/0090358 | A1* | 4/2011 | Tojo | H04N 23/61 |
| | | | | 348/222.1 |
| 2016/0019698 | A1* | 1/2016 | Kalva | G06V 20/53 |
| | | | | 382/103 |
| 2020/0193146 | A1* | 6/2020 | Pu | G06V 20/52 |
| 2021/0064851 | A1* | 3/2021 | Zhang | G06V 10/50 |
| 2021/0192239 | A1* | 6/2021 | Ma | G06F 18/285 |
| 2022/0067391 | A1* | 3/2022 | Chang | G06V 40/50 |

FOREIGN PATENT DOCUMENTS

| | | |
|---|---|---|
| CN | 107292911 A | 10/2017 |
| CN | 108256729 A | 7/2018 |
| CN | 108564038 A | 9/2018 |
| CN | 108986064 A | 12/2018 |
| CN | 109272347 A | 1/2019 |
| CN | 109409517 A | 3/2019 |
| CN | 110930432 A | 3/2020 |
| CN | 112232210 A | 1/2021 |
| KR | 20170082299 A | 7/2017 |

OTHER PUBLICATIONS

Li, W. et al., "Research on the Intelligent Statistics System of Social Application-based closed areas," Digital World, No. 4, Apr. 1, 2018, 6 pages. (Submitted with English Translation).

Zhou, K. et al., "Design of a Traffic Statistics System Based on Contour Rules," New Technology and New Process, vol. 3, Mar. 25, 2020, 19 pages. (Submitted with English Translation).

Hu, H. et al., "Vehicle detection method based on improved R-FCN," Computer Engineering and Design, vol. 41, No. 4, Apr. 2020, 13 pages. (Submitted with English Translation).

Gu, C. et al., "Detection for Pin Defects of Overhead Lines by UAV Patrol Image Based on Improved Faster-RCNN," High Voltage Engineering, vol. 46, No. 9, Sep. 30, 2020, 20 pages. (Submitted with English Translation).

ISA China National Intellectual Property Administration, International Search Report and Written Opinion Issued in Application No. PCT/CN2021/117702, Dec. 7, 2021, WIPO, 15 pages. (Submitted with Partial English Translation).

China National Intellectual Property Administration, Office Action and Search Report Issued in Application No. 202011108232.0, Feb. 2, 2023, 14 pages. (Submitted with Partial English Translation).

* cited by examiner

PERSON FLOW ANALYSIS METHOD AND SYSTEM, ELECTRONIC DEVICE, AND READABLE STORAGE MEDIUM

CROSS-REFERENCE TO RELATED APPLICATIONS

The present application is a U.S. National Phase of International Application No. PCT/CN2021/117702, entitled "PEOPLE TRAFFIC ANALYSIS METHOD AND SYSTEM, ELECTRONIC DEVICE, AND READABLE STORAGE MEDIUM," and filed on Sep. 10, 2021. International Application No. PCT/CN2021/117702 claims priority to Chinese Patent Application No. 202011108232.0 filed on Oct. 16, 2020. The entire contents of the above-listed applications are hereby incorporated by reference for all purposes.

TECHNICAL FIELD

The present disclosure relates to the field of object recognition and tracking technology, in particular to a person flow analysis method and system, an electronic device and a readable storage medium.

BACKGROUND

Person flow information can be used as an important reference for decision-making. In the related art, person flow in a specific area is identified and tracked by analyzing surveillance video data in the area. However, such method requires a high amount of calculation and a relatively high requirement for hardware devices, which is difficult to meet low-cost usage scenarios with low hardware level.

SUMMARY

Embodiments of the present disclosure provide a person flow analysis method and system, an electronic device, and a readable storage medium, which can reduce an amount of calculation for identifying and tracking of movement of persons.

According to a first aspect, one embodiment of the present disclosure provides a person flow analysis method, including: obtaining a video image of a target area; identifying and tracking target features of persons in the video image; and generating person flow data for the target area according to movement states of the target features of the persons relative to a specific position in the target area.

In some embodiments, the specific position in the target area is identified by at least one positioning line group; and each positioning line group includes at least one positioning line.

In some embodiments, a number of the positioning lines in each positioning line group is at least two; and the at least two positioning lines included in each positioning line group are arranged side by side.

In some embodiments, there are at least three positioning line groups; two groups among the at least three positioning line groups are arranged at two sides of the target area, respectively; and at least part of one group among the at least three positioning line groups is arranged in the target area, and is set to cross a traffic direction of the target area.

In some embodiments, the generating person flow data for the target area according to movement states of the target features of the persons relative to a specific position in the target area, includes:

obtaining a contact parameter between a target feature of a target person in the persons and the positioning line; determining a movement direction of the target person in the target area according to the contact parameter; and updating the person flow data of the target area according to the movement direction of the target person.

In some embodiments, a number of the positioning lines in each positioning line group is at least two, and the at least two positioning lines included in each positioning line group are arranged side by side; each positioning line group includes a first positioning line and a second positioning line;

the determining a movement direction of the target person in the target area according to the contact parameter, includes:
in case that the target feature of the target person sequentially contacts the first positioning line and the second positioning line, determining that the movement direction of the target person is a first direction, wherein the first direction is a direction from the first positioning line to the second positioning line;
the updating the person flow data of the target area according to the movement direction of the target person, includes:
according to a number of target persons whose movement direction is determined as the first direction, updating a counted number of persons moving in the first direction.

In some embodiments, the tracking target features of persons included in the identifying and tracking target features of persons in the video image, includes:
obtaining tracking information of a target feature of a person in first video data; wherein the tracking information includes a position and a movement speed of the target feature of the person in the first video data, and the first video data includes at least one frame of image before a target frame of image;
generating prediction information of a movement trajectory of the target feature, according to the tracking information;
obtaining a detection result of the target feature of the person in the target frame of image;
matching the detection result with the prediction information; and
updating the tracking information according to a matching result.

In some embodiments, the identifying and tracking target features of persons in the video image, includes: detecting a target feature of a person; the detecting a target feature of a person, includes:
detecting the target feature of the person; wherein a confidence degree of the target feature is not less than a first confidence degree threshold, and a recall rate of the target feature of the person is a first recall rate;
adjusting the confidence degree of the target feature to be not less than a second confidence degree threshold, so that the recall rate of the target feature of the person is a second recall; wherein the second confidence degree threshold is less than the first confidence degree threshold, the second recall rate is greater than the first recall rate, and a precision of the target feature of the person is a first precision in case that the recall rate of the target feature of the person is the second recall rate;
adjusting the confidence degree of the target feature to be not less than a third confidence degree threshold, according to tracking information of the target feature of the person; wherein in case that the confidence degree of the target feature is not less than the third confidence degree threshold, the precision of the target feature of the person is a second precision, the recall rate of the target feature of the person is a third recall rate, the second precision is greater than the first precision, and the third recall rate is less than the second recall rate and greater than the first recall rate.

In some embodiments, the generating person flow data for the target area according to movement states of the target features of the persons relative to a specific position in the target area, includes:

identifying and tracking a target feature of a first object;
obtaining a target feature of a preset second object; and
if the target feature of the first object matches the target feature of the second object, deleting person flow data related to the first object.

According to a second aspect, one embodiment of the present disclosure provides a person flow analysis system, including: an image acquisition device and a person flow analysis device. The image acquisition device is configured to collect video images of a target area. The person flow analysis device includes:

a video image obtaining module configured to obtain a video image of a target area;
an identifying-tracking module configured to identify and track target features of persons in the video image; and
a person flow data generation module configured to generate person flow data for the target area according to movement states of the target features of the persons relative to a specific position in the target area.

In some embodiments, the specific position in the target area is identified by at least one positioning line group; and each positioning line group includes at least one positioning line.

In some embodiments, a number of the positioning lines in each positioning line group is at least two; and the at least two positioning lines included in each positioning line group are arranged side by side.

In some embodiments, the person flow data generation module includes:

a contact generation and obtaining sub-module configured to obtain a contact parameter between a target feature of a target person in the persons and the positioning line;
a movement direction determination submodule configured to determine a movement direction of the target person in the target area according to the contact parameter; and
a person flow data update submodule configured to update the person flow data of the target area according to the movement direction of the target person.

In some embodiments, the identifying-tracking module includes a detection sub-module; the detection sub-module is configured to detect the target feature of the person; the detection sub-module specifically includes:

a detection unit configured to detect the target feature of the person; wherein a confidence degree of the target feature is not less than a first confidence degree threshold, and a recall rate of the target feature of the person is a first recall rate;
a first adjustment unit configured to adjust the confidence degree of the target feature to be not less than a second confidence degree threshold, so that the recall rate of the target feature of the person is a second recall; wherein the second confidence degree threshold is less than the first confidence degree threshold, the second recall rate is greater than the first recall rate, and a precision of the target feature of the person is a first precision in case that the recall rate of the target feature of the person is the second recall rate;
a second adjustment unit configured to adjust the confidence degree of the target feature to be not less than a third confidence degree threshold, according to tracking information of the target feature of the person; wherein in case that the confidence degree of the target feature is not less than the third confidence degree threshold, the precision of the target feature of the person is a second precision, the recall rate of the target feature of the person is a third recall rate, the second precision is greater than the first precision, and the third recall rate is less than the second recall rate and greater than the first recall rate.

According to a third aspect, one embodiment of the present disclosure provides an electronic device, including: a processor, a memory, and a computer program stored on the memory and executable on the processor; wherein the computer program is executed by the processor to implement steps in the person flow analysis method according to the first aspect.

According to a fourth aspect, one embodiment of the present disclosure provides a readable storage medium, including: a computer program stored thereon; wherein the computer program is executed by a processor to implement steps in the person flow analysis method according to the first aspect.

By identifying and monitoring the target features in the video images of the target area, the embodiments of the present disclosure do not need to analyze and identify all features of the persons, which helps to reduce the amount of calculation, thereby reducing the use cost and increasing the scope of application.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions of embodiments of the present disclosure will be described hereinafter in a clear and complete manner in conjunction with the drawings of the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

The present disclosure provides a person flow analysis method.

Figure 1:
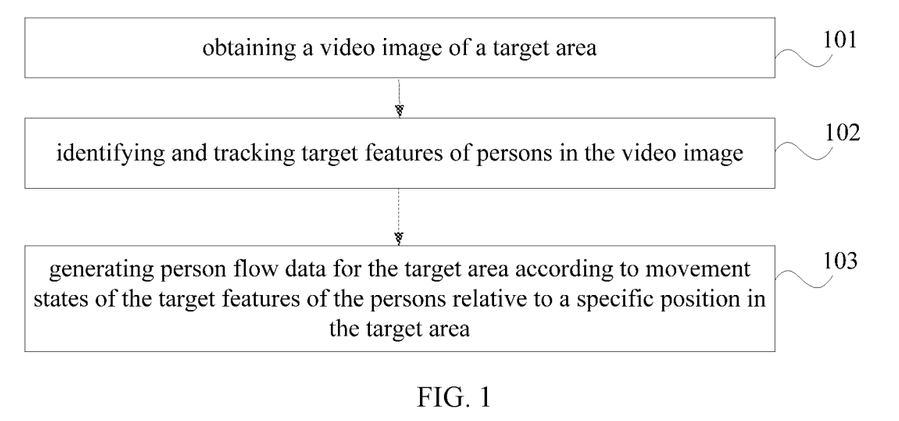
FIG. 1 is a flowchart of a person flow analysis method according to an embodiment of the present disclosure.

In one embodiment, as shown in FIG. 1, the person flow analysis method includes the following steps:

Step 101: obtaining a video image of a target area;

Step 102: identifying and tracking target features of persons in the video image;

Step 103: generating person flow data for the target area according to movement states of the target features of the persons relative to a specific position in the target area.

In the technical solution of this embodiment, the video image of the target area is first obtained, and then the target features of the persons in the video image are identified and tracked.

It should be understood that identifying all features of persons in the video image requires a relatively high amount of calculation, and thus the technical solution of the present disclosure only identifies and tracks target features of persons, and further counts a person flow according to the target features to generate person flow data. The target feature may be a head feature of a target person, or may be other features, such as a specific identification on the target person, a specific dress.

The specific position in this embodiment refers to an area set for the target area, according to which the movement states of persons relative to the target area is determined In one embodiment, taking the target area being an entrance of a store as an example, a video capture device set for the target area captures a video image at the entrance, where persons in the video image may pass by the entrance, or may enter or leave the store through the entrance. By setting a door frame area as the specific position, it can be determined whether one person passes through the entrance or just passes by the door according to a relative movement state between the person and the door frame.

By identifying and monitoring the target features in the video images of the target area, the embodiments of the present disclosure do not need to analyze and identify all features of the persons, which helps to reduce the amount of calculation, thereby reducing the use cost and increasing the scope of application. Meanwhile, by analyzing the movement state of the target feature of the person relative to the specific position in the target area, a movement mode of a user in the target area can be obtained, which helps to improve the accuracy of analysis of the person flow in the target area.

In some embodiments, the specific location in the target area may be set based on elements in the video image, such as a warning line, a door frame, a road sign in the video image.

In some embodiments, the specific position in the target area is identified by at least one positioning line group. Each positioning line group includes at least one positioning line, thereby improving versatility and convenience of processing.

In one embodiment, the foregoing step 103 includes:

obtaining a contact parameter between a target feature of a target person in the persons and the positioning line; determining a movement direction of the target person in the target area according to the contact parameter; and updating the person flow data of the target area according to the movement direction of the target person.

In this embodiment, the positioning line may be added into the video image during the process of acquiring the video image, or the positioning line may be added into the video image during the subsequent image analysis process.

The positioning line is located at a specific position which enables it to determine a movement state of the person relative to the target area.

For example, for a corridor, by setting a positioning line to be perpendicular to an extension direction of the corridor and running through a width direction of the corridor, then if a person passes through the corridor, there must be a position where the person intersects with the positioning line. For another example, for different visiting items set on a square, by setting a positioning line to be around each visiting item, if a person enters into a visiting area, the person will inevitably intersect with a positioning line corresponding to the visiting area.

The contact parameter between the target feature and the positioning line may be a contact direction or a contact time.

In one embodiment, each positioning line group includes a positioning line, and the contact parameter includes a contact direction. In this way, a movement trajectory of a person can be determined according to a movement state of a target feature of the person relative to the positioning line. For example, if a person's head contacts a longitudinally set positioning line from the left, a movement direction of the person is from left to right; if the person's head contacts the positioning line from the right, then the person's movement direction is from right to left.

In this way, by setting each positioning line group at least including at least one positioning line, detection of person flow data in the target area can be realized conveniently and quickly.

In some embodiments, when a number of the positioning lines in each positioning line group is at least two, in case that the at least two positioning lines included in each positioning line group are arranged side by side, each positioning line group includes a first positioning line and a second positioning line.

The determining a movement direction of the target person in the target area according to the contact parameter, includes:

in case that the target feature of the target person sequentially contacts the first positioning line and the second positioning line, determining that the movement direction of the target person is a first direction, where the first direction is a direction from the first positioning line to the second positioning line.

The updating the person flow data of the target area according to the movement direction of the target person, includes:

according to the number of target persons whose movement direction is determined as the first direction, updating a counted number of persons moving in the first direction.

In this embodiment, the number of the positioning lines in each positioning line group is at least two, and the at least two positioning lines included in each positioning line group are arranged side by side. In this embodiment, a plurality of positioning lines is set, and the movement direction of the person is detected through the positioning lines.

As shown in FIG. 2A to FIG. 4B, detection of person flow data at a gate of a shopping mall with a target feature being the head of a person, is taken as an example for description. The gate is a target area, and multiple positioning line groups are set for the gate. When a person moves near the gate, movement of the person can be detected by detecting relative a movement state between the person and these positioning lines.

Referring to FIG. 2A to FIG. 4B, in a specific implementation manner, there are at least three positioning line groups, and two groups among the at least three positioning line groups are arranged at two sides of the target area, respectively. In this embodiment, the two positioning line groups include one group including a positioning line A1 and a positioning line A2, and another group including a positioning line B1 and a positioning line B2.

At least part of one group among the at least three positioning line groups is arranged in the target area, and is set to cross a traffic direction of the target area.

The one group among the at least three positioning line groups includes one group including a positioning line C1 and a positioning line C2. In this embodiment, the traffic direction of the target area refers to a direction perpendicular to the door. In this embodiment, the positioning lines C1 and C2 are parallel to an upper edge of a door frame, and are located at a position above an approximate center of the door. It should be understood that if the position of the positioning line relative to the door is set too high, the positioning line may not be able to contact the head of the person. Therefore, in actual implementation, the position of the positioning line should be set according to a ratio of height of a person to door.

It should be understood that the purpose of setting the positioning line is to improve convenience and accuracy of detection. Therefore, the positioning lines C1 and C2 need to extend from one end of the door to the other end of the door, to prevent missed detection.

Similarly, lengths of the positioning lines on two sides of the door can also be adjusted. For example, the lengths of the positioning lines on two sides of the door may extend from a top of the door to a bottom of the door, or may only extend along a part of the door, that is, according to the height of the person, the positioning lines on two sides of the door may be placed in an area where the head of the person may exist.

Further, each group of the above mentioned three positioning line groups intersects with at least another group of positioning lines, so that multiple positioning line groups are equivalent to forming a detection range around the specific area, which helps to further improve accuracy of detection of a person's head.

During implementation, when a person moves from an inside of the door to an outside of the door, the head of the person will touch the positioning line close to the door frame, and then touch the positioning line far from the door frame. When the person moves from the outside of the door to the inside of the door, the head of the person will first touch the positioning line far away from the door frame, and then touch the positioning line close to the door frame.

Figure 2A:
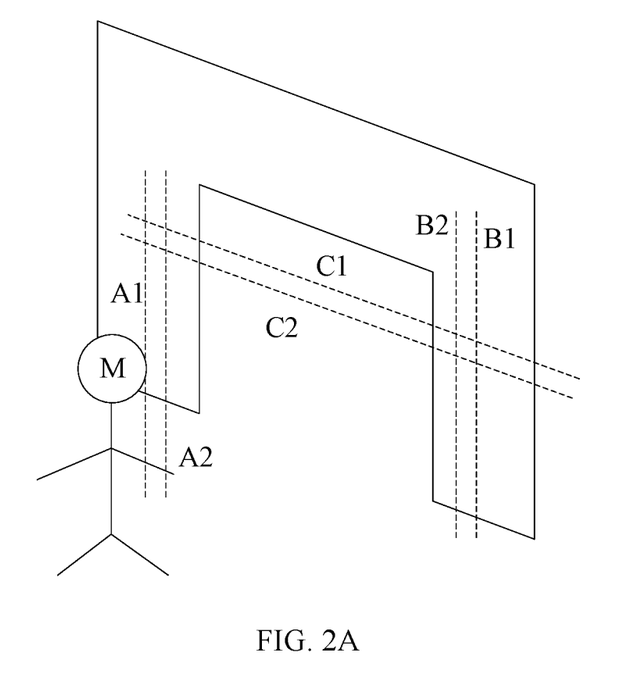
FIG. 2A is a scene diagram showing movement of persons according to an embodiment of the present disclosure.
Figure 2B:
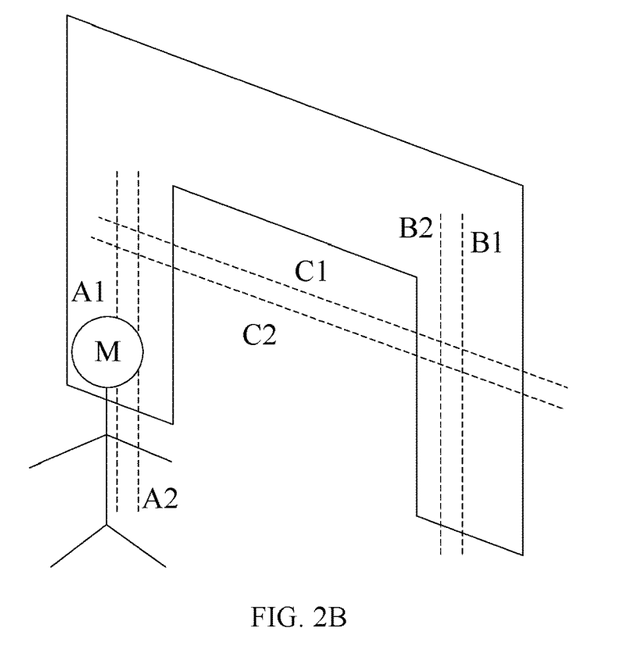
FIG. 2B is a scene diagram showing movement of persons according to an embodiment of the present disclosure.

Further, as shown in FIG. 2A and FIG. 2B, when a person M approaches the door from the left and passes by the door, his head will contact the positioning line A1 and the positioning line A2 in turn. After the person M enters a range in front of the door, if the person M moves to the left, his head will contact the positioning line A2 and the positioning line A1 in turn.

Figure 3A:
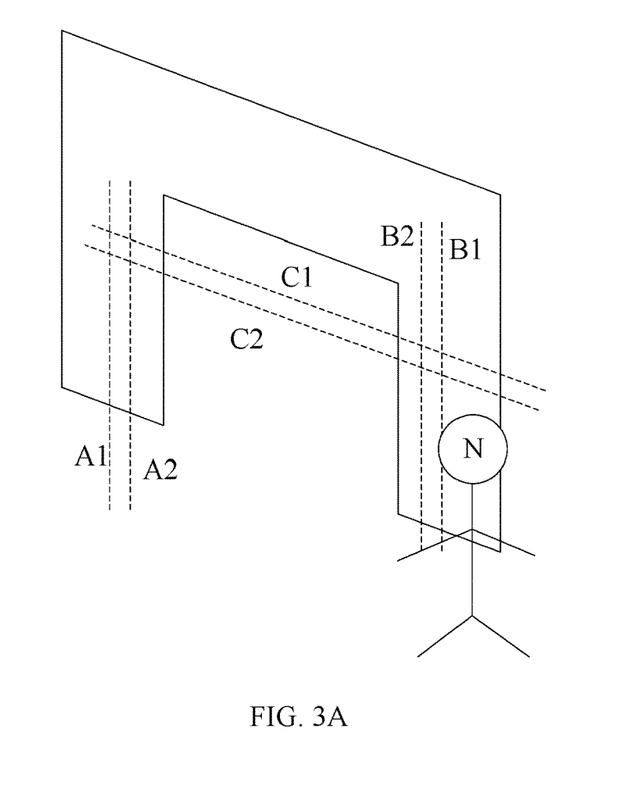
FIG. 3A is a scene diagram showing movement of persons according to an embodiment of the present disclosure.
Figure 3B:
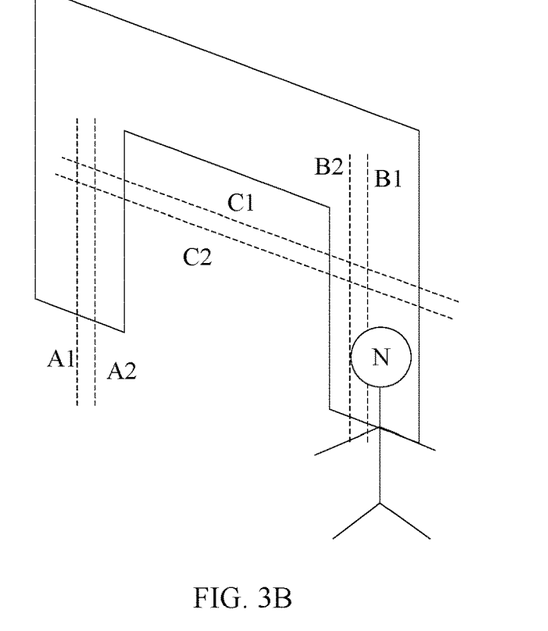
FIG. 3B is a scene diagram showing movement of persons according to an embodiment of the present disclosure.

As shown in FIG. 3A and FIG. 3B, when a person N approaches the door from the right and passes by the door, his head will contact the positioning line B1 and the positioning line B2 in turn. After the person N enters a range in front of the door, if the person N moves to the right, his head will contact the positioning line B2 and the positioning line B1 in turn.

Figure 4A:
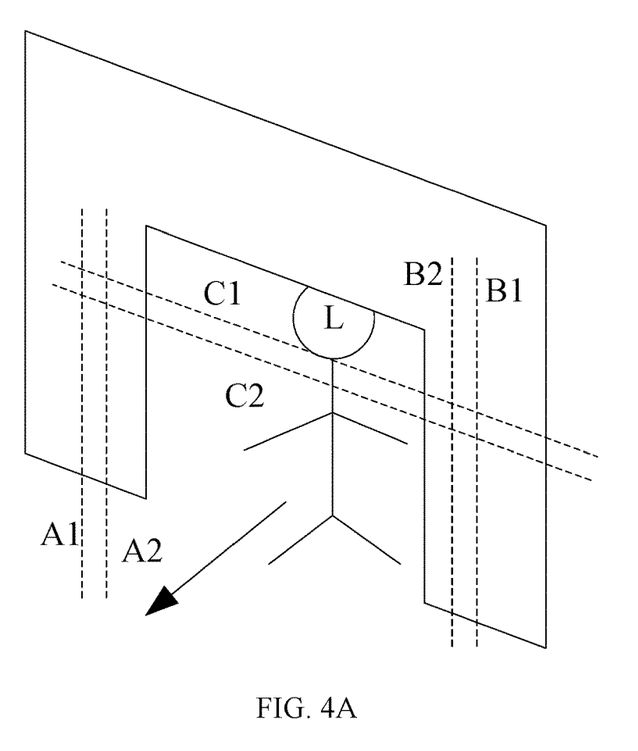
FIG. 4A is a scene diagram showing movement of persons according to an embodiment of the present disclosure.
Figure 4B:
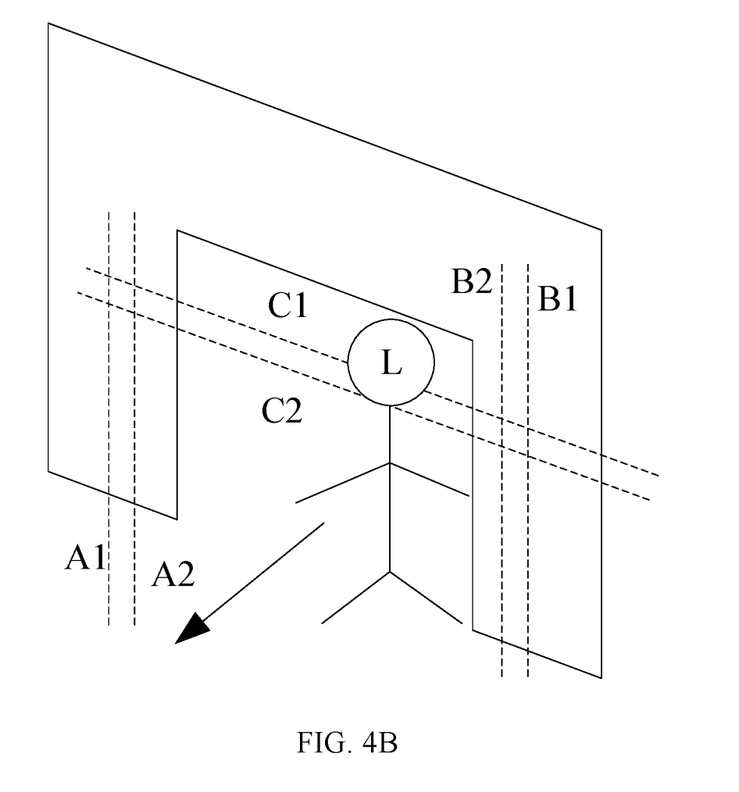
FIG. 4B is a scene diagram showing movement of persons according to an embodiment of the present disclosure.

As shown in FIG. 4A and FIG. 4B, when a person L passes through the door in a direction indicated by an arrow, his head will contact the positioning line C1 and the positioning line C2 in turn. When the person L passes through the door in an opposite direction of the direction indicated by the arrow, his head will contact the positioning line C2 and the positioning line C1 in turn.

In this way, by designing positioning lines, a movement direction of the person can be determined according to the contact sequence between the head of the person and each positioning line. Further, quantity and flow of the persons can be updated according to the movement direction.

During implementation, for example, related data such as the number of persons entering the mall every day and persons flows in different periods of the mall, can be counted according to monitoring data at an entrance of a mall, thereby obtaining more detailed person flow data.

For example, if the above mentioned first direction is a direction of leaving the gate of the mall, and an opposite direction of the first direction is a direction of entering the gate, then each time a person moving in the first direction is detected, the number of persons entering the gate will be added by one, and a total number of persons in the mall will be added by one. If a person moving in the opposite direction of the first direction is detected, the number of persons leaving the gate is added by one, and the total number of persons in the mall is decreased by one.

For another example, when there are multiple positioning line groups, person flows in different directions can be counted separately, thereby obtaining more accurate person flow data.

In some embodiments, the above step 102 includes a step of detecting a target feature of a person. The step of detecting the target feature of the person, includes:

detecting the target feature of the person; where a confidence degree of the target feature is not less than a first confidence degree threshold, and a recall rate of the target feature of the person is a first recall rate;

adjusting the confidence degree of the target feature to be not less than a second confidence degree threshold, so that the recall rate of the target feature of the person is a second recall; where the second confidence degree threshold is less than the first confidence degree threshold, the second recall rate is greater than the first recall rate, and a precision of the target feature of the person is a first precision in case that the recall rate of the target feature of the person is the second recall rate;

adjusting the confidence degree of the target feature to be not less than a third confidence degree threshold, according to tracking information of the target feature of the person; where in case that the confidence degree of the target feature is not less than the third confidence degree threshold, the precision of the target feature of the person is a second precision, the recall rate of the target feature of the person is a third recall rate, the second precision is greater than the first precision, and the third recall rate is less than the second recall rate and greater than the first recall rate.

In the technical solution of this embodiment, the target feature of the person is initially detected first, and a result of the target feature obtained by the conventional detection has a default confidence degree threshold, which is recorded as the first confidence degree in this embodiment. In the example, the first confidence degree may be 0.7 for illustration.

During implementation, after completion of identifying and detecting the target features of the persons in the image, a target feature whose confidence degree is greater than the first confidence degree threshold is obtained from a detection result.

In case that the confidence degree of the target feature is the first confidence degree, the recall rate of the target feature of the person is the first recall rate.

Next, for the detection result, in this embodiment, the confidence degree threshold of the target feature is further reduced, and the confidence degree threshold of the target feature is gradually reduced from the default confidence degree. In case that the confidence degree threshold of the target feature is gradually reduced, some data that are not originally used will be adopted, which generally will lead to an increase in the number of obtained target features of the person. Thus, in this process, the recall rate of the target feature will gradually increase until the recall rate of the target feature of the person is the second recall rate. The second recall rate is greater than the first recall rate, and is a larger value, thereby ensuring comprehensiveness of detection of the head of the person.

In this embodiment, the second recall rate is 0.99 as an example. At this point, the precision of the target feature of the person is the first precision, the confidence degree of the target feature of the person is the second confidence degree, and the second confidence degree is less than the first confidence degree.

Further, the confidence degree threshold of the target feature of the person is further adjusted to improve precision of the target feature of the person. Here, the confidence degree threshold is fine-tuned, which, specifically, may be increased or decreased, so that the precision of the target feature of the person reaches the second precision.

During this adjustment process, the recall rate of the target feature of the person becomes the third recall rate. During this process, the recall rate may be slightly reduced, that is, the third recall rate may be less than the second recall rate. For example, after fine-tuning, the precision of the target feature of the person reaches the second precision which is specifically 0.98, and the precision of the person's target feature reaches the second precision which is specifically 0.98.

In this way, the final obtained result has relatively high recall rate and precision, so that the recall rate and precision have a high balance, and relatively accurate calculation results can be obtained without consuming a lot of computation.

In some embodiments, the above step 102 includes a step of tracking the target feature of the person. The step of tracking the target feature of the person, includes:
 obtaining tracking information of a target feature of a person in first video data; where the tracking information includes a position and a movement speed of the target feature of the person in the first video data, and the first video data includes at least one frame of image before a target frame of image;
 generating prediction information of a movement trajectory of the target feature, according to the tracking information;
 obtaining a detection result of the target feature of the person in the target frame of image;
 matching the detection result with the prediction information; and
 updating the tracking information according to a matching result.

In the process of tracking the target feature of the person, the tracking information included in the first video data is obtained first, and the first video data may be understood as several frames of historical image data before the target frame of image.

During implementation, Kalman filtering may be used to predict a position and a movement speed of the head of the person, thereby generating the prediction information of the movement trajectory of the target feature of the person, for example, prediction information of the movement trajectory of the head.

Next, the target feature of the person in the target frame is identified. If a matching degree between an identification result and the predicted trajectory is high, it means that the identified target feature of the person and the predicted target feature of the person are likely to be the target feature of the same person. In this way, the prediction information is used as reference data to realize identification and tracking of the head of the person, which helps to reduce the amount of calculation and improve the accuracy of tracking of the target feature of the person.

It should be understood that, for a person in an initially input image data or a person who has just entered an image acquisition area, there is no previous movement trajectory. At this point, an acquired target feature can be initialized as a corresponding movement trajectory. Further, when the target feature of the person is further detected subsequently, further prediction, detection and matching are performed, and the tracking information for the target feature of the person is updated according to the matching result.

When extracting the target feature of the person, efficient image features can be selected based on feature engineering methods, such as color features and histogram of oriented gradient (HOG). Targeted extraction of features helps to reduce the amount of calculations, and is also suitable for embedded systems. Further, feature vectors and areas of the extracted target feature and the predicted result are matched to obtain intersection-over-union (IoU), thereby determining a matching degree of the target feature and the predicted result.

It should be noted that, during the statistical analysis of the person flow data, other processing strategies may also be added to process the person flow data, so as to improve the accuracy of the person flow data.

In some embodiments, if a certain person enters and exits multiple times in a short period of time, only one entry and exit can be counted, thereby avoiding repeated statistics and improving accuracy of person flow.

In some embodiments, generating person flow data for the target area according to the target features of the persons, further includes:
 identifying and tracking a target feature of a first object;
 obtaining a target feature of a preset second object;
 if the target feature of the first object matches the target feature of the second object, deleting person flow data related to the first object.

In this embodiment, according to actual situations, some data affecting the statistics of person flow are further removed.

The first object refers to any object identified and tracked in the video image, and the second object refers to an object that needs to be eliminated.

For example, when counting person flow in a square, it is necessary to exclude cleaning staff and patrol staff in the square; when counting person flow in a store, it is necessary to exclude clerks, so that more accurate person flow information can be obtained.

In this embodiment, the target feature of the second object is generated in advance. For example, when counting person flow in a store, a photo or video data of a clerk can be input in advance and a corresponding target feature is generated. In the process of identifying and tracking the first object, if a detected target feature matches the target feature of the second object, i.e., the clerk, then the detected target feature of the first object is deleted, thereby obtaining a more accurate statistical result of the person flow in the store.

In the technical solution of this embodiment, a lightweight detection model should be used as much as possible to help reduce system load. In the process of data operation, a multi-threaded parallel execution method should be used as much as possible, for example, using different threads to execute the above mentioned data collection process, second object identification process, etc., which help to avoid occupying time in the main process and improve computing efficiency. In the calculation process, heterogeneous computing can be adopted, that is, the combination of a central processing unit (CPU) and a graphics processing unit (GPU) can be used to calculate relevant data, so that the performance of GPU and CPU can be fully utilized, which is more suitable for embedded systems.

After the detection and tracking of the persons, more information can be generated according to the results. For example, through analysis and statistics of gender and age of the persons, customer flow attributes of the store can be identified, which helps to provide more information.

Apparently, in this process, the more accurate the relied on person flow data, the more valuable the analysis results are. During implementation, high-quality target features of persons can be analyzed. For example, the target features without occlusion and at a good identification angle, can be analyzed, which helps to improve accuracy of analysis results.

One embodiment of the present disclosure further provides a person flow analysis system, which includes an image acquisition device and a person flow analysis device. The image acquisition device is used to collect video images of a target area.

Figure 5:
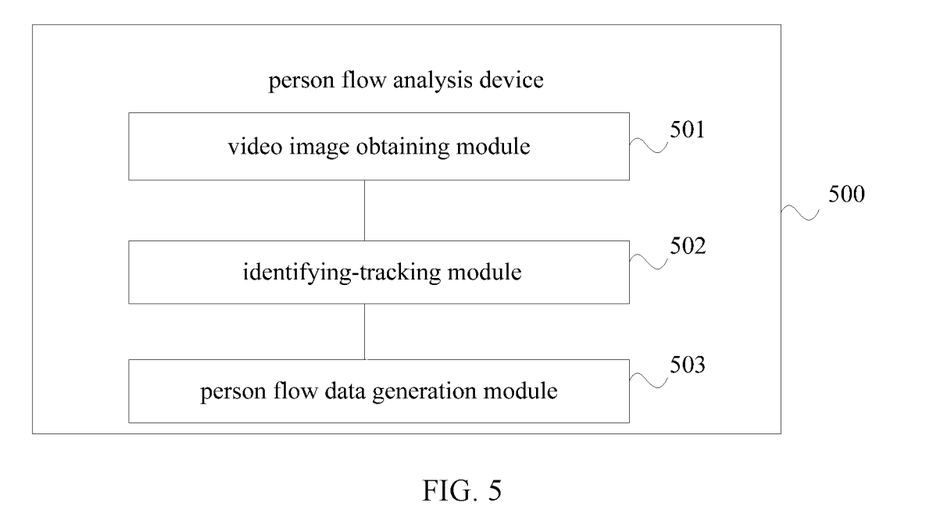
FIG. 5 is a diagram of a person flow analysis device according to an embodiment of the present disclosure.

As shown in FIG. 5, in one embodiment, the person flow analysis device 500 includes:
  a video image obtaining module 501 configured to obtain a video image of a target area;
  an identifying-tracking module 502 configured to identify and track target features of persons in the video image;
  a person flow data generation module 503 configured to generate person flow data for the target area according to movement states of the target features of the persons relative to a specific position in the target area.

In some embodiments, the specific location in the target area is identified by at least one positioning line group. Each positioning line group includes at least one positioning line.

In some embodiments, the number of the positioning lines in each positioning line group is at least two, and the at least two positioning lines included in each positioning line group are arranged side by side.

In some embodiments, there are at least three positioning line groups, and two groups among the at least three positioning line groups are arranged at two sides of the target area, respectively. At least part of one group among the at least three positioning line groups is arranged in the target area, and is set to cross a traffic direction of the target area.

In some embodiments, the person flow data generation module 503 includes:
  a contact generation and obtaining sub-module configured to obtain a contact parameter between a target feature of a target person in the persons and the positioning line;
  a movement direction determination submodule configured to determine a movement direction of the target person in the target area according to the contact parameter; and
  a person flow data update submodule configured to update the person flow data of the target area according to the movement direction of the target person.

In some embodiments, when the number of the positioning lines in each positioning line group is at least two, in case that the at least two positioning lines included in each positioning line group are arranged side by side, each positioning line group includes a first positioning line and a second positioning line.

The movement direction determination submodule is configured to, in case that the target feature of the target person sequentially contacts the first positioning line and the second positioning line, determine that the movement direction of the target person is a first direction, where the first direction is a direction from the first positioning line to the second positioning line.

The person flow data update submodule is configured to, according to the number of target persons whose movement direction is determined as the first direction, update a counted number of persons moving in the first direction.

In some embodiments, the identifying-tracking module 502 includes a tracking sub-module. The tracking sub-module is configured to track the target feature of the person. The tracking sub-module specifically includes:
  a tracking information obtaining unit configured to obtain tracking information of a target feature of a person in first video data; where the tracking information includes a position and a movement speed of the target feature of the person in the first video data, and the first video data includes at least one frame of image before a target frame of image;
  a prediction unit configured to generate prediction information of a movement trajectory of the target feature, according to the tracking information;
  a detection result obtaining unit configured to obtain a detection result of the target feature of the person in the target frame of image; and
  a matching unit configured to match the detection result with the prediction information; and
  a tracking information tracking unit configured to update the tracking information according to a matching result.

In some embodiments, the identifying-tracking module 502 includes a detection sub-module. The detection submodule is configured to detect the target feature of the person. The detection sub-module specifically includes:
  a detection unit configured to detect the target feature of the person; where a confidence degree of the target feature is not less than a first confidence degree threshold, and a recall rate of the target feature of the person is a first recall rate;
  a first adjustment unit configured to adjust the confidence degree of the target feature to be not less than a second confidence degree threshold, so that the recall rate of the target feature of the person is a second recall; where the second confidence degree threshold is less than the first confidence degree threshold, the second recall rate is greater than the first recall rate, and a precision of the target feature of the person is a first precision in case that the recall rate of the target feature of the person is the second recall rate;

a second adjustment unit configured to adjust the confidence degree of the target feature to be not less than a third confidence degree threshold, according to tracking information of the target feature of the person; where in case that the confidence degree of the target feature is not less than the third confidence degree threshold, the precision of the target feature of the person is a second precision, the recall rate of the target feature of the person is a third recall rate, the second precision is greater than the first precision, and the third recall rate is less than the second recall rate and greater than the first recall rate.

In some embodiments, the person flow data generation module 503 further includes:

a first object identifying-tracking submodule configured to identify and track a target feature of a first object;

a second object identifying-tracking submodule configured to obtain a target feature of a preset second object;

a deletion sub-module configured to, if the target feature of the first object matches the target feature of the second object, delete person flow data related to the first object.

The person flow analysis device in this embodiment can implement the steps of the above mentioned embodiments of the person flow analysis method, and can achieve the same or similar technical effects, which will not be repeated here.

One embodiment of the present disclosure further provides an electronic device, including a processor, a memory, a computer program stored in the memory and executable on the processor. The computer program is executed by the processor to implement each process of the above-mentioned embodiments of the person flow analysis method, and the same technical effect can be achieved. In order to avoid repetition, details are not repeated here.

One embodiment of the present disclosure further provides a readable storage medium including a computer program stored thereon. The computer program is executed by a processor to implement each process of the above-mentioned embodiments of the person flow analysis method, and the same technical effect can be achieved. In order to avoid repetition, details are not repeated here. The readable storage medium is, for example, a read-only memory (ROM), a random access memory (RAM), a magnetic disk, or an optical disk.

One of ordinary skill in the art may learn that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

One of ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure. Therefore, the protection scope of the present disclosure should be subject to the protection scope of the claims.

The invention claimed is:

1. A person flow analysis method, comprising:
obtaining a video image of a target area;
identifying and tracking target features of persons in the video image; and
generating person flow data for the target area according to movement states of the target features of the persons relative to a specific position in the target area;
wherein the tracking target features of persons comprised in the identifying and tracking target features of persons in the video image, comprises:

obtaining tracking information of a target feature of a person in first video data; wherein the tracking information comprises a position and a movement speed of the target feature of the person in the first video data, and the first video data comprises at least one frame of image before a target frame of image;

generating prediction information of a movement trajectory of the target feature, according to the tracking information;

obtaining a detection result of the target feature of the person in the target frame of image;

matching the detection result with the prediction information; and updating the tracking information according to a matching result.

2. The method according to claim 1, wherein the specific position in the target area is identified by at least one positioning line group; and each positioning line group comprises at least one positioning line.

3. The method according to claim 2, wherein a number of the positioning lines in each positioning line group is at least two; and the at least two positioning lines comprised in each positioning line group are arranged side by side.

4. The method according to claim 2, wherein there are at least three positioning line groups; two groups among the at least three positioning line groups are arranged at two sides of the target area, respectively; and at least part of one group among the at least three positioning line groups is arranged in the target area, and is set to cross a traffic direction of the target area.

5. The method according to claim 2, wherein the generating person flow data for the target area according to movement states of the target features of the persons relative to a specific position in the target area, comprises:
obtaining a contact parameter between a target feature of a target person in the persons and the positioning line;
determining a movement direction of the target person in the target area according to the contact parameter; and
updating the person flow data of the target area according to the movement direction of the target person.

6. The method according to claim 5, wherein a number of the positioning lines in each positioning line group is at least two, and the at least two positioning lines comprised in each positioning line group are arranged side by side; each positioning line group comprises a first positioning line and a second positioning line;
the determining a movement direction of the target person in the target area according to the contact parameter, comprises:
in case that the target feature of the target person sequentially contacts the first positioning line and the second positioning line, determining that the movement direction of the target person is a first direction, wherein the first direction is a direction from the first positioning line to the second positioning line;
the updating the person flow data of the target area according to the movement direction of the target person, comprises:
according to a number of target persons whose movement direction is determined as the first direction, updating a counted number of persons moving in the first direction.

7. The method according to claim 5, wherein the identifying and tracking target features of persons in the video image, comprises: detecting a target feature of a person; the detecting a target feature of a person, comprises:

detecting the target feature of the person; wherein a confidence degree of the target feature is not less than a first confidence degree threshold, and a recall rate of the target feature of the person is a first recall rate;

adjusting the confidence degree of the target feature to be not less than a second confidence degree threshold, so that the recall rate of the target feature of the person is a second recall; wherein the second confidence degree threshold is less than the first confidence degree threshold, the second recall rate is greater than the first recall rate, and a precision of the target feature of the person is a first precision in case that the recall rate of the target feature of the person is the second recall rate;

adjusting the confidence degree of the target feature to be not less than a third confidence degree threshold, according to tracking information of the target feature of the person; wherein in case that the confidence degree of the target feature is not less than the third confidence degree threshold, the precision of the target feature of the person is a second precision, the recall rate of the target feature of the person is a third recall rate, the second precision is greater than the first precision, and the third recall rate is less than the second recall rate and greater than the first recall rate.

8. The method according to claim 1, wherein the generating person flow data for the target area according to movement states of the target features of the persons relative to a specific position in the target area, comprises:
identifying and tracking a target feature of a first object;
obtaining a target feature of a preset second object; and
if the target feature of the first object matches the target feature of the second object, deleting person flow data related to the first object;
wherein the first object refers to any person identified and tracked in the video image, and the second object refers to a preset person that affects statistics of person flow and needs to be eliminated.

9. An electronic device, comprising: a processor, a memory, and a computer program stored on the memory and executable on the processor; wherein the computer program is executed by the processor to implement:
obtaining a video image of a target area; wherein the target area is an entrance, and a door frame area of the target area is a specific position;
identifying and tracking target features of persons in the video image; and
generating person flow data for the target area according to movement states of the target features of the persons relative to the specific position in the target area;
wherein the identifying and tracking target features of persons in the video image, comprises: detecting a target feature of a person; the detecting a target feature of a person, comprises:
detecting the target feature of the person; wherein a confidence degree of the target feature is not less than a first confidence degree threshold, and a recall rate of the target feature of the person is a first recall rate;
adjusting the confidence degree of the target feature to be not less than a second confidence degree threshold, so that the recall rate of the target feature of the person is a second recall; wherein the second confidence degree threshold is less than the first confidence degree threshold, the second recall rate is greater than the first recall rate, and a precision of the target feature of the person is a first precision in case that the recall rate of the target feature of the person is the second recall rate;

adjusting the confidence degree of the target feature to be not less than a third confidence degree threshold, according to tracking information of the target feature of the person; wherein in case that the confidence degree of the target feature is not less than the third confidence degree threshold, the precision of the target feature of the person is a second precision, the recall rate of the target feature of the person is a third recall rate, the second precision is greater than the first precision, and the third recall rate is less than the second recall rate and greater than the first recall rate;

wherein the specific position in the target area is identified by at least one positioning line group; and each positioning line group comprises at least one positioning line;

wherein a number of the positioning lines in each positioning line group is at least two; and the at least two positioning lines comprised in each positioning line group are arranged side by side;

wherein when generating person flow data for the target area according to movement states of the target features of the persons relative to the specific position in the target area, the computer program is executed by the processor to implement:

obtaining a contact parameter between a target feature of a target person in the persons and the positioning line;

determining a movement direction of the target person in the target area according to the contact parameter; and updating the person flow data of the target area according to the movement direction of the target person;

wherein a number of the positioning lines in each positioning line group is at least two, and the at least two positioning lines comprised in each positioning line group are arranged side by side; each positioning line group comprises a first positioning line and a second positioning line;

when determining a movement direction of the target person in the target area according to the contact parameter, the computer program is executed by the processor to implement: in case that the target feature of the target person sequentially contacts the first positioning line and the second positioning line, determining that the movement direction of the target person is a first direction, wherein the first direction is a direction from the first positioning line to the second positioning line;

when updating the person flow data of the target area according to the movement direction of the target person, the computer program is executed by the processor to implement: according to a number of target persons whose movement direction is determined as the first direction, updating a counted number of persons moving in the first direction.

10. A non-transitory computer-readable storage medium, comprising: a computer program stored thereon; wherein the computer program is executed by a processor to implement:

obtaining a video image of a target area;

identifying and tracking target features of persons in the video image; and generating person flow data for the target area according to movement states of the target features of the persons relative to a specific position in the target area;

wherein the tracking target features of persons comprised in the identifying and tracking target features of persons in the video image, comprises:

obtaining tracking information of a target feature of a person in first video data; wherein the tracking information comprises a position and a movement speed of the target feature of the person in the first video data, and the first video data comprises at least one frame of image before a target frame of image;

generating prediction information of a movement trajectory of the target feature, according to the tracking information;

obtaining a detection result of the target feature of the person in the target frame of image;

matching the detection result with the prediction information; and updating the tracking information according to a matching result.

11. The electronic device according to claim 9, wherein when tracking target features of persons included in the identifying and tracking target features of persons in the video image, the computer program is executed by the processor to implement:

obtaining tracking information of a target feature of a person in first video data; wherein the tracking information includes a position and a movement speed of the target feature of the person in the first video data, and the first video data includes at least one frame of image before a target frame of image;

generating prediction information of a movement trajectory of the target feature, according to the tracking information;

obtaining a detection result of the target feature of the person in the target frame of image;

matching the detection result with the prediction information; and updating the tracking information according to a matching result.

12. The electronic device according to claim 9, wherein when generating person flow data for the target area according to movement states of the target features of the persons relative to a specific position in the target area, the computer program is executed by the processor to implement:

identifying and tracking a target feature of a first object;

obtaining a target feature of a preset second object; and if the target feature of the first object matches the target feature of the second object, deleting person flow data related to the first object;

wherein the first object refers to any person identified and tracked in the video image, and the second object refers to a preset person that affects statistics of person flow and needs to be eliminated.

13. The non-transitory computer-readable storage medium according to claim 10, wherein the specific position in the target area is identified by at least one positioning line group; and each positioning line group comprises at least one positioning line;

wherein when generating person flow data for the target area according to movement states of the target features of the persons relative to a specific position in the target area, the computer program is executed by the processor to implement:

obtaining a contact parameter between a target feature of a target person in the persons and the positioning line;

determining a movement direction of the target person in the target area according to the contact parameter; and updating the person flow data of the target area according to the movement direction of the target person.

14. The non-transitory computer-readable storage medium according to claim 13, wherein a number of the positioning lines in each positioning line group is at least two, and the at least two positioning lines comprised in each positioning line group are arranged side by side; each positioning line group comprises a first positioning line and a second positioning line;

when determining a movement direction of the target person in the target area according to the contact parameter, the computer program is executed by the processor to implement: in case that the target feature of the target person sequentially contacts the first positioning line and the second positioning line, determining that the movement direction of the target person is a first direction, wherein the first direction is a direction from the first positioning line to the second positioning line;

when updating the person flow data of the target area according to the movement direction of the target person, the computer program is executed by the processor to implement: according to a number of target persons whose movement direction is determined as the first direction, updating a counted number of persons moving in the first direction.

15. The method according to claim 1, wherein the target feature is at least one of a head feature of a target person, a specific identification on the target person or a specific dress of the target person.

16. The method according to claim 1, wherein the target area is an entrance, and a door frame area of the target area is the specific position.

* * * * *